US 10,645,030 B2

(12) United States Patent
Zaifman et al.

(10) Patent No.: US 10,645,030 B2
(45) Date of Patent: *May 5, 2020

(54) AUGMENTATION OF PATTERN MATCHING WITH DIVERGENCE HISTOGRAMS

(71) Applicant: AT&T Intellectual Property I, L.P., Atlanta, GA (US)

(72) Inventors: Arthur L. Zaifman, Millburn, NJ (US); John M. Mocenigo, Califon, NJ (US); Glen Zdroik, Long Valley, NJ (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,548

(22) Filed: Jul. 8, 2019

(65) Prior Publication Data

US 2019/0334839 A1    Oct. 31, 2019

Related U.S. Application Data

(63) Continuation of application No. 15/489,392, filed on Apr. 17, 2017, now Pat. No. 10,348,650.

(51) Int. Cl.
*H04J 3/14* (2006.01)
*H04L 1/00* (2006.01)
(Continued)

(52) U.S. Cl.
CPC .......... *H04L 49/555* (2013.01); *H04L 41/145* (2013.01); *H04L 43/0876* (2013.01); *H04L 41/0213* (2013.01); *H04L 41/0681* (2013.01)

(58) Field of Classification Search
CPC ............... H04L 49/555; H04L 41/0213; H04L 41/0681; H04L 41/145; H04L 43/0876
See application file for complete search history.

(56) References Cited

U.S. PATENT DOCUMENTS 6,889,218 B1    5/2005  Nassehi
7,440,461 B2   10/2008  Sahita et al.
(Continued)

FOREIGN PATENT DOCUMENTS

WO    2017027003 A1    2/2017
WO    2017034512 A1    3/2017

OTHER PUBLICATIONS

Daniel Kifer et al., "Detecting change in data streams." Proceedings of the Thirtieth international conference on Very large data bases—vol. 30. VLDB Endowment, Aug. 31, 2004. pp. 180-191.
(Continued)

*Primary Examiner* — Maharishi V Khirodhar

(57) ABSTRACT

A processor may apply data blocks of a training data set to a pattern matching algorithm to identify whether the data blocks match a pattern, determine points of divergence between the data blocks and the pattern, count a number of times that each of a plurality of positions in the pattern is determined to be a point of divergence, and determine a position with a highest count of a number of times that the position is determined to be a point of divergence. The processor may further receive an incoming data block, compare a data value at the position in the pattern with the highest count to a data value at a corresponding position in the incoming data block, and determine a mismatch when the data value at the position in the pattern and the data value at the corresponding position in the incoming data block are different.

20 Claims, 4 Drawing Sheets

(51) Int. Cl.
　　　*H04L 12/26*　　(2006.01)
　　　*H04L 12/28*　　(2006.01)
　　　*H04L 12/16*　　(2006.01)
　　　*H04L 12/939*　(2013.01)
　　　*H04L 12/24*　　(2006.01)

(56) References Cited

U.S. PATENT DOCUMENTS

| | | | |
|---|---|---|---|
| 7,738,373 | B2 | 6/2010 | Lerner et al. |
| 7,808,916 | B1 | 10/2010 | Futamura et al. |
| 8,005,771 | B2 | 8/2011 | Chen et al. |
| 8,229,917 | B1 | 7/2012 | Aneas et al. |
| 8,271,403 | B2 | 9/2012 | Rieck et al. |
| 8,365,284 | B2 | 1/2013 | Wahl |
| 8,442,954 | B2 | 5/2013 | Spackman |
| 8,601,564 | B2 | 12/2013 | Wahl et al. |
| 8,701,162 | B1 | 4/2014 | Pedersen |
| 8,713,190 | B1 | 4/2014 | Goodall et al. |
| 8,769,682 | B2 | 7/2014 | Choyi et al. |
| 9,218,527 | B2 | 12/2015 | Lakshminarayan et al. |
| 9,305,043 | B2 | 4/2016 | Sakurai et al. |
| 9,379,951 | B2 | 6/2016 | Mihnev |
| 10,348,650 | B2 * | 7/2019 | Zaifman ............... H04L 49/555 |
| 2007/0150949 | A1 | 6/2007 | Futamura et al. |
| 2009/0073891 | A1 | 3/2009 | Duffield et al. |
| 2014/0230062 | A1 | 8/2014 | Kumaran |
| 2016/0219065 | A1 | 7/2016 | Dasgupta et al. |
| 2016/0241577 | A1 | 8/2016 | Johnson et al. |
| 2016/0259849 | A1 | 9/2016 | Sinha et al. |
| 2016/0328654 | A1 | 11/2016 | Bauer et al. |
| 2017/0250855 | A1 | 8/2017 | Patil et al. |
| 2017/0364851 | A1 | 12/2017 | Maheshwari et al. |

OTHER PUBLICATIONS

Jianhua Lin, "Divergence measures based on the Shannon entropy." IEEE Transactions on Information theory, vol. 37, Issue 1 (Jan. 1991), pp. 145-151: 145151.

Laura Rettig et al. "Online anomaly detection over big data streams." Big Data (Big Data), 2015 IEEE International Conference on. IEEE, Oct. 29, 2015. 10 Pages. https://exascale.info/assets/pdf/Rettig_BigData-15. pdf.

Johannes Gehrke et al., "On computing correlated aggregates over continual data streams." ACM SIGMOD Record. vol. 30, Issue 2. ACM, May 21, 2001. pp. 13-24. http://dl.acm.org/citation.cfm?id=375665.

Gabriel Cretu, Casting out demons: sanitizing training data for anomaly sensors, 2008.

Andreas Kind, Histogram based traffic anomaly Detection, Jun. 2009.

Collective Contextual Anomaly Detection Framework for smart buildings, Jul. 24-29, 2016, Daniel; Araya et al.

Anomaly detection in electricity consumption data of buildings using predictive, Jun. 27, 2014, Jesse Eisses.

Xiaobin Tan, Hidden Semi-Markov model for anomaly detection, Department of Automation University, China, 2008.

Ke Wang, Anomalous Payload Based Network Intrusion detection, Computer Science Department, Columbia University, 2004.

* cited by examiner

AUGMENTATION OF PATTERN MATCHING WITH DIVERGENCE HISTOGRAMS

This application is a continuation of U.S. patent application Ser. No. 15/489,392, filed Apr. 17, 2017, now U.S. Pat. No. 10,348,650, which is herein incorporated by reference in its entirety.

The present disclosure relates generally to pattern matching algorithms, and more particularly to devices, computer-readable storage media, and methods for front-end determination of mismatches between data blocks and patterns using divergence histograms.

BACKGROUND

Pattern scanning techniques are used for a variety of applications and services. For instance, pattern scanning, or pattern matching is utilized in telecommunication networks for various tasks such as packet classification and packet routing, traffic shaping, load balancing, monitoring of traffic volumes and traffic types for billing, network upgrade planning, and other purposes, network anomaly detection, malware detection, denial of service detection, intrusion detection, and so forth. Pattern matching algorithms are also utilized in other tasks such as image matching, facial, voice, or other biometric recognition functions, and so forth.

SUMMARY

In one example, the present disclosure provides a device, computer-readable medium, and method for determining a mismatch between a data block and a pattern of a pattern matching algorithm. For example, a processor may apply data blocks of a training data set to a pattern matching algorithm to identify whether the data blocks of the training data set match a pattern of the pattern matching algorithm, determine points of divergence between the data blocks of the training data set and the pattern, count a number of times that each of a plurality of positions in the pattern is determined to be a point of divergence between the data blocks of the training data set and the pattern, and determine a position in the pattern with a highest count of a number of times that the position in the pattern is determined to be a point of divergence between the data blocks of the training data set and the pattern. The processor may further receive an incoming data block, compare a data value at the position in the pattern with the highest count to a data value at a corresponding position in the incoming data block, and determine a mismatch between the incoming data block and the pattern when the data value at the position in the pattern and the data value at the corresponding position in the incoming data block are different.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
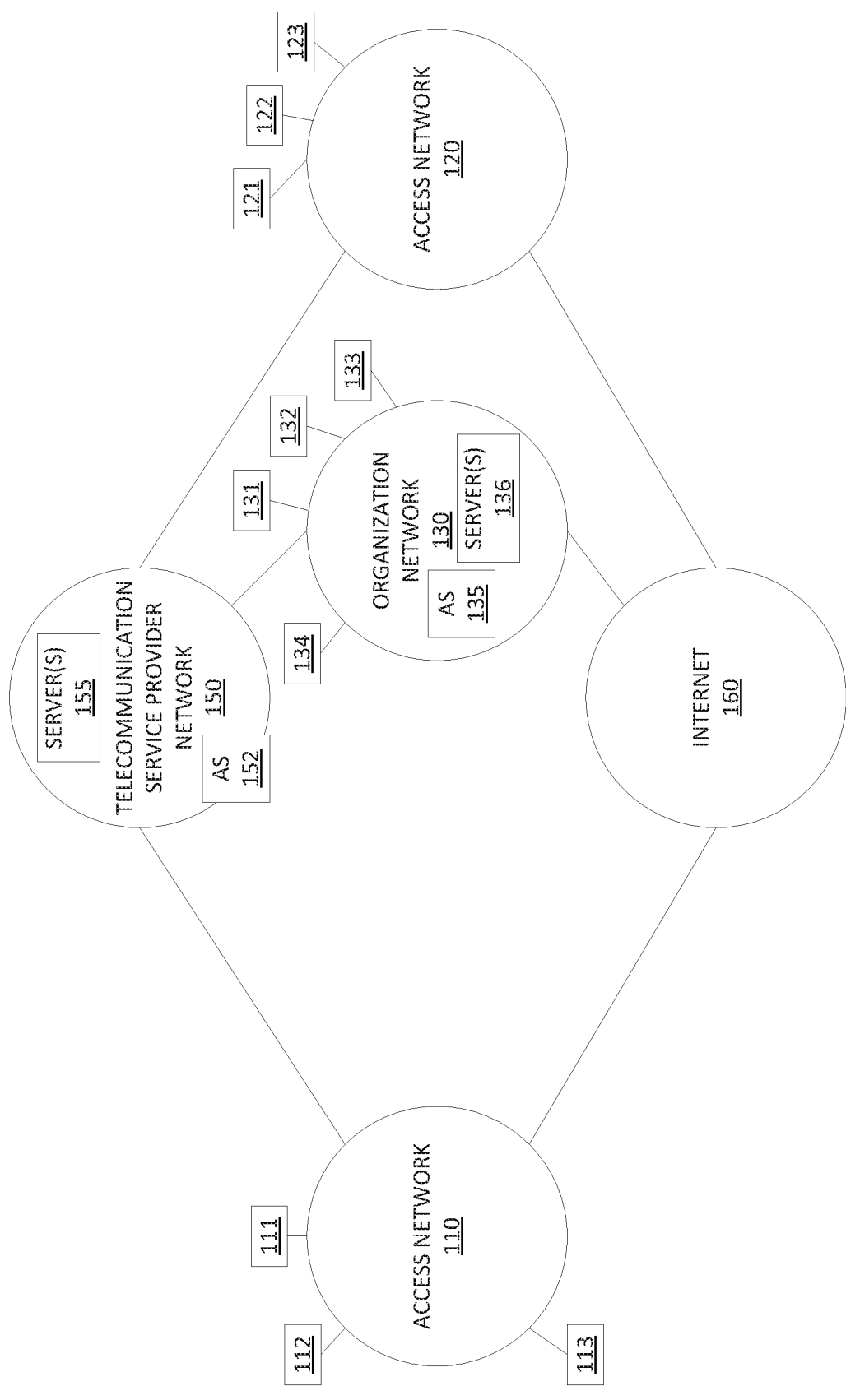
FIG. 1 illustrates one example of a system including a telecommunication service provider network, according to the present disclosure.

The present disclosure broadly discloses devices, non-transitory (i.e., tangible or physical) computer-readable storage media, and methods for determining a mismatch between a data block and a pattern of a pattern matching algorithm or method, (e.g., prior to application of the pattern matching algorithm). For instance, examples of the present disclosure, create and update meta-data driven histograms, referred to herein as "divergence histograms," that are applied prior to a pattern scanning algorithm to reduce the average number of comparisons required to determine if a pattern does not match. In particular, examples of the present disclosure augment classical pattern search algorithms to leverage meta-data rich environments in order to reduce the average number of comparisons. For instance, Internet usage patterns of cellular users are highly repetitive and predictable. Users tend to visit the same sites or use the same applications on a regular basis, e.g., for webmail, banking, social media, news, etc. In addition, the usage is also fairly regular in terms of time of day and/or day of week patterns. For instance, a user may be in the habit of checking road traffic before leaving for work in the morning and prior to heading home at the end of the work day, which may involve invoking the same application and accessing the same uniform resource locator (URL) at least two times a day, five days a week.

In accordance with the present disclosure, divergence histograms may be continuously refreshed "off-line" (e.g., when resources are available or during non-busy hours) and may be used as "signatures" for faster pattern searching, or pattern scanning. For example, several types of multi-pattern scanning techniques, which may be referred to herein as trie search algorithms, utilize a trie data structure (broadly a "trie") to collectively represent various patterns, where the trie data structure is scanned via the trie search algorithm to match patterns. In one example, data blocks, e.g., packets, of training data are applied to a trie search algorithm to determine points/positions of divergence between the data blocks of the training data and the various patterns. Broadly, a point of divergence comprises a symbol mismatch when traversing a node in the trie according to the trie search algorithm, where a node corresponds to a position in a sequence of symbols of one or more patterns represented by the trie. A count is kept for the number of times each position for each pattern was found to be a point of divergence. For each pattern, the counts regarding each of the positions in the pattern may be collectively be referred to as a "divergence histogram" for the pattern. A position (or positions) in the pattern with the highest count may be considered a point (or points) of most likely divergence. It is these points that may then be used for rapid pre-processing of incoming data blocks in connection with a trie search algorithm. In addition, it should be noted that a similar process may be utilized with respect to determining points of divergence and generating divergence histograms for patterns represented in different types of data structures and utilized in connection with different type of pattern searching algorithms, such as finite state machines, directed acyclic graphs, hash tables, and so forth.

In one example, different divergence histograms may be generated for each pattern in connection with different correlative identifiers, such as time of day, day of week, etc. For instance, a first set of training data may include data blocks taken only from successive Mondays, another set of training data may include data blocks taken only from successive Tuesdays, still another set of training data may include data blocks taken only from the hours of 9:00-10:00 am on successive days, and so forth.

In one example, divergence histograms that are created as described above may then be applied to pre-process incoming data blocks, e.g., prior to processing via a full pattern matching algorithm for whichever task the pattern matching algorithm is deployed, such traffic identification, routing, firewall functions, virus detection, etc. In particular, for a given pattern, a comparison may be made between symbols at one or more positions in the incoming data block corresponding to the position(s) identified in a divergence histogram as the most likely point(s) of divergence. When there is a mismatch in at least one of these positions, it is determined that the incoming data block does not match the pattern. In addition, similar comparisons may be made to the divergence histograms for any additional patterns of the pattern matching algorithm that are represented in the trie or other data structure. If there is a mismatch for all patterns, it can be concluded that the data block does not match any of the patterns, and thus, a traversal of the trie or other data structure may be skipped and a next data block may be processed. Notably, in many network traffic processing applications, it is expected that the vast majority of data blocks (e.g., packets) will not match a pattern. Thus, the vast majority of packets that are non-matches may be more efficiently processed by ruling out potential pattern matches using the divergence histograms. Only packets that are not determined to be mismatches may be processed via the full packet searching algorithm, e.g., a full trie traversal, to confirm a match to one or more patterns.

In one example, each pattern may have various associated histograms, e.g., for the various correlative inputs with respect to which the divergence histograms may be created. Thus, in one example, divergence histograms may be selected to be applied to an incoming data block based upon the data block satisfying one or more correlative input criteria. For instance, if the data block is a packet received between 9:00-10:00 am, histograms that may be associated with 9:00-10:00 am may be selected for processing the incoming data block, whereas a data block received between 5:00-6:00 pm may have different histograms selected for processing the incoming data block. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure for determining a mismatch between a data block and a pattern of a pattern matching algorithm may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. In one example, telecommunication service provider network 150 may also include an application server (AS) 152 and one or more servers 155, as described in greater detail below. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113 and 121-123, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of access networks 110 and 120 may comprise an ISP network, such that 111-113 and/or 121-123 may communicate over the Internet 160, without involvement of telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like.

In one example, the access networks 110 and 120 may be different types of access networks. In another example, the access networks 110 and 120 may be the same type of access network. In one example, one or more of the access networks 110 and 120 may be operated by the same or a different service provider from a service provider operating telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, organization network 130 may comprise a local area network (LAN), or a distributed network connected through permanent virtual circuits (PVCs), virtual private networks (VPNs), and the like for providing data and voice communications. In one example, organization network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134 comprise devices of organizational agents, such as customer service agents, or other employees or representatives who are tasked with addressing customer-facing issues on behalf of the organization that provides organization network 130. In one example, endpoint devices 131-134 may each comprise a telephone for analog or digital telephony, a mobile device, a cellular smart phone, a laptop, a tablet computer, a desktop computer, a bank or cluster of such devices, and the like.

In one example, organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call via a telephone or engage in text or multi-media based chat conversations via endpoint devices 111-113 and 121-123 with customer service representatives using endpoint devices 131-134.

In one example, organization network 130 may also include an application server (AS) 135. In one example, AS 135 may comprise a computing system, such as computing system 400 depicted in FIG. 4, and may be configured to provide one or more functions for determining a mismatch between a data block and a pattern of a pattern matching algorithm, in accordance with the present disclosure. Similarly, in one example, AS 152 in telecommunication service provider network 150 may comprise a computing system, such as computing system 400 depicted in FIG. 4, and may be configured to provide one or more functions for determining a mismatch between a data block and a pattern of a pattern matching algorithm, in accordance with the present disclosure. For example, AS 152 or AS 135 may be configured to perform one or more steps, functions, or operations in connection with the example method 300 described below. Thus, as described herein, functions of AS 152 may alternatively be performed by AS 135, and vice versa. In particular, AS 152 and/or AS 135 may generate and update divergence histograms for pattern search algorithms in accordance with the present disclosure. Alternatively, or in addition, AS 152 and/or AS 135 may implement various functions of a pattern searching algorithm, e.g., including the use of divergence histogram-based pre-processing in accordance with the present disclosure.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one example, the system 100 may also include one or more servers 136 and/or one or more servers 155 in organization network 130 and telecommunication service provider network 150, respectively. In one example, the servers 136 and/or 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. Other centralized system components may include, for example, a layer 3 router, a short message service (SMS) server, a voicemail server, a video-on-demand server, a server for network traffic analysis, and so forth. In addition, in accordance with the present disclosure, centralized system components may also include devices and/or servers for implementing pattern searching algorithms in accordance with the present disclosure for various services such as: traffic analysis, traffic shaping, firewall functions, malware detection, intrusion detection, customer churn prediction, content recommendation generation, and so forth. It should be noted that in one example, a centralized system component may be hosted on a single server, while in another example, a centralized system component may be hosted on multiple servers, e.g., in a distributed manner.

In general, the centralized system components may collect, aggregate, and/or store various types of data that may be used as training data for creating and updating divergence histograms for various types of pattern searching algorithms, such as: payload and/or header data of packets, frames, datagrams, or other protocol data units (PDUs), network signaling and traffic data, call detail records (CDRs) or session records, which may contain a device type identifier (e.g., the manufacturer, model, firmware version and other similar features which distinguish one device type from another), a cell identifier, which identifies the cell that serves the device (e.g., the serving base station), one or more application identifiers identifying the application(s) used in the session, and usage statistics for the session, such as a total number of bytes, total number of packets, and total number of flows during that session, and so on, customers' network service profile data, demographic data, and/or service usage data, mobile device location data, and various other types of data (broadly "network operation records"). Other types of data may include records generated by an interactive voice response (IVR) system of organization network 130 (e.g., one of servers 136), call summary records entered by call center personnel of organization network 130, and so forth. Still other types of data may include audio, video, and or image data, e.g., for image, voice, or other pattern recognition, for gait analysis, and so on, and may comprise data that is transmitted via one or more networks and/or links of the system 100, and/or which is stored by one of the centralized system components, e.g., a database server, or cluster.

In accordance with the present disclosure, in one example, AS 152 (and/or AS 135) may store various patterns in one or more data structures in connection with one or more pattern matching algorithms. The patterns, data structures, and/or pattern matching algorithms may be entered by an operator, such as network operations personnel, or may be automatically generated and provided to AS 152 (and/or AS 135) by another network device. In addition, in one example, AS 152 (and/or AS 135) may also collect network operations records or other types of data from one or more centralized system components (e.g., servers 155 and/or servers 136). In one example, the data that is collected may relate to customers associated with endpoint devices 111-113 and 121-123, e.g., network traffic data for such customers, service profile data for such customers, and so forth. In one example, the centralized system components may forward data to AS 152 (and/or AS 135) on a periodic basis, when a certain quantity of data has been collected and is ready to transmit, etc. Alternatively, or in addition, AS 152 (and/or AS 135) may query the centralized system component(s), e.g., periodically or on some other basis, in order to retrieve the data. As described in greater detail below, AS 152 (and/or AS 135) may then generate divergence histograms for various patterns of a pattern search algorithm. In one example, AS 152 (and/or AS 135) may also modify/update the pattern search algorithm to include a pre-processing using the divergence histograms. In one example, the modified pattern search algorithm may be deployed at AS 152 and/or AS 135. In another example, the modified pattern search algorithm may be deployed at one or more of the centralized system components from which the data is gathered, or at one or more different centralized system components. For instance, a centralized system component may comprise a router with a packet/stream filtering function that may utilize a modified pattern search algorithm in accordance with the present disclosure. In another example, a centralized system component may implement a speech recognition function that utilizes a pattern search algorithm on a stream of voice data to identify a speaker. In addition, as referred to herein, a stream may comprise real-time data that is traversing a network or that is being generated by one or more devices, sensors, and so forth. A stream may also comprise a stored series of new data, such as a sequence of images, e.g., discrete images or frames in video, a batch of files, and the like. For instance, another centralized system component may implement a virus/malware detection module with a pattern search algorithm to detect virus/malware signatures in data files that are stored on one or more centralized system components or which are in transit via any one or more networks of the system 100.

For illustrative purposes, examples of the present disclosure are described herein primarily in connection with trie data structures and trie search algorithms for multi-pattern recognition. However, it should also be noted that in other, further, and different examples, variations of one or more of the above described operations may be implemented in accordance with the present disclosure. For example, different search algorithms may be utilized in connection with different types of data structures for storing patterns to be matched, such as other types of finite state machines, directed acyclic graphs, hash tables, and so forth. In another example, the present disclosure may relate to search algorithms and pattern storage data structures for individual patterns. Various additional functions of AS 152 (and/or AS 135) in connection with determining a mismatch between a data block and a pattern of a pattern matching algorithm are described in greater detail below in connection with the examples of FIGS. 2 and 3. In addition, it should be realized that the system 100 may be implemented in a different form than that illustrated in FIG. 1, or may be expanded by including additional endpoint devices, access networks, network elements, application servers, etc. without altering the scope of the present disclosure.

Figure 2:
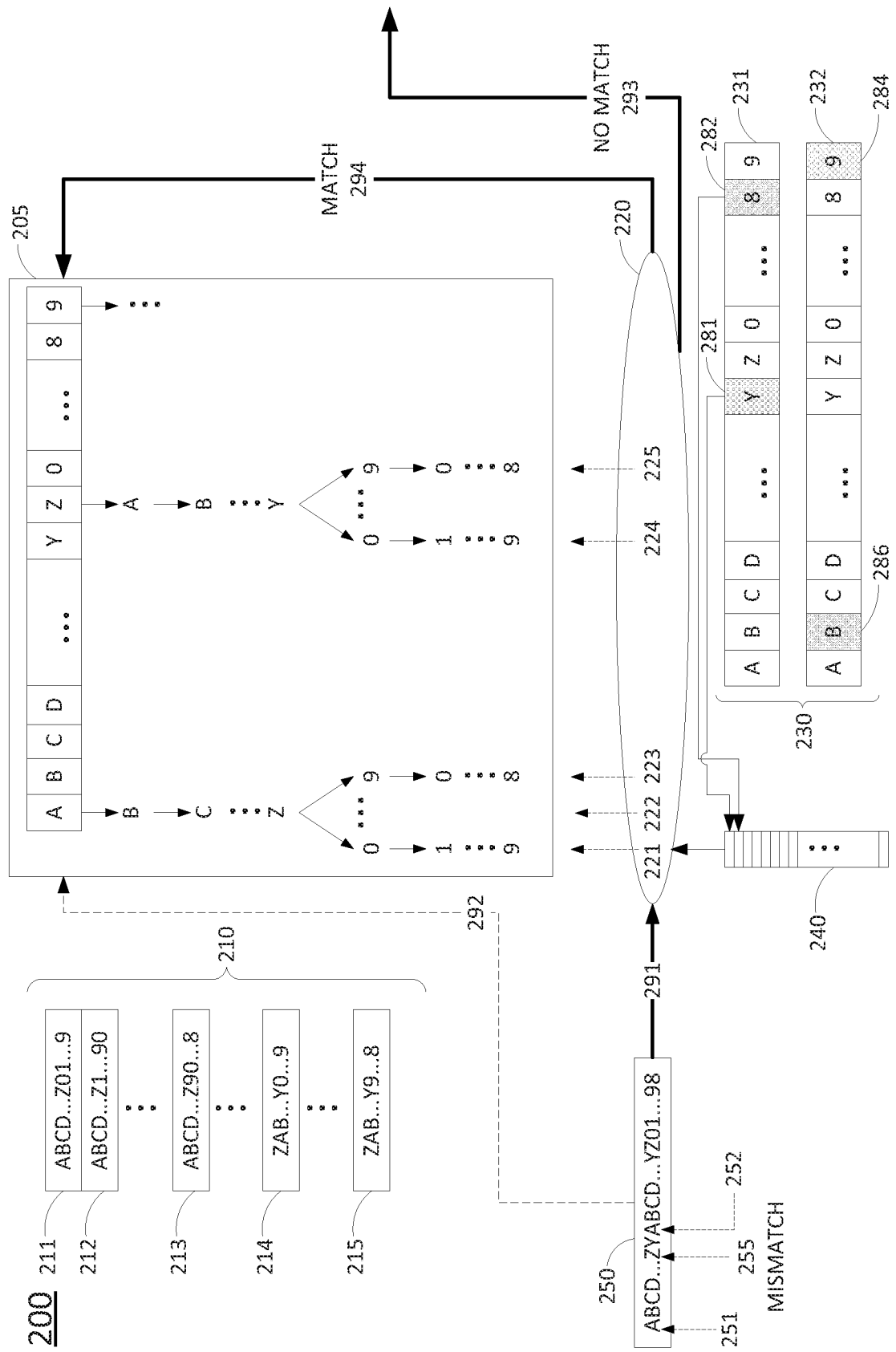
FIG. 2 illustrates an example of a trie data structure and pattern matching algorithm modified to include a divergence histogram-based pre-processing, in accordance with the present disclosure.

FIG. 2 illustrates an example 200 of a trie data structure and pattern matching algorithm modified to include a divergence histogram-based pre-processing, in accordance with the present disclosure. As illustrated in FIG. 2, the trie 205 may represent a plurality of patterns, e.g., a pattern set 210 containing ten patterns (several of which are specifically labeled as 211-215, respectively). In addition, several branches of the trie 205 are shown in greater detail in FIG. 2. However, for ease of illustration, various patterns of the pattern set 210 and branches of the trie 205 are omitted. In one example, different divergence histograms associated with different correlative inputs may be generated for patterns in the pattern set 210 (and hence also in the trie 205).

As illustrated in FIG. 2, a set 230 of divergence histograms comprising two divergence histograms 231 and 232 may be generated for the first pattern 211. For instance, the first divergence histogram 231 may relate to a first time period, such as morning hours of 6:00 am to 9:30 am, while the second divergence histogram 232 may relate to a second time period, such as evening hours of 4:30 pm to 7:00 pm. Other types of correlative inputs for which histograms may be created include, "less than X number of packets since an exchange of handshake messages," an accessing of a particular uniform resource locator (URL) by a particular mobile device, and so forth. In one example, divergence histograms, such as divergence histograms 231 and 232 may be re-ordered as look-up tables sorted in descending order of a likelihood of a mismatch. For instance, look-up table 240 may represent divergence histogram 231, where a first entry may include a position where a mismatch is most likely (the position labeled 281) and the data value at the position (e.g., the letter "Y"), a second entry may include a position where a mismatch is the next most likely (the position labeled 282)

and the data value at the position (e.g., the number "8"), and so forth. Notably, divergence histogram 232 may have a different mix of positions that are the most likely to result in a mismatch, the second most likely to result in a mismatch, etc. For instance, the position labeled 284 may be the position in divergence histogram 232 that is the most likely to result in a mismatch, followed by the position labeled as 286 being a position that is the second most likely to result in a mismatch, and so on.

In one example, divergence histogram 231 or 232 may be selected for use in a set of divergence histograms 220 for the patterns in the pattern set 210. In the present example, the divergence histogram 231 may be selected and may be reordered and deployed in the set of divergence histograms 220, e.g., in the form of look-up table 240. For instance, divergence histogram 231 may be selected when the conditions of correlative input(s) of divergence histogram 231 are satisfied, such as the time of day being between 6:00 am to 9:30 am. It should be noted that divergence histograms for other patterns in the pattern set 210 may be reordered as look-up tables and may be selected for use in the set of divergence histograms 220, e.g., when the conditions of the respective correlative inputs are satisfied. Labels 221-225 are illustrated in the set of divergence histograms 220 and may represent divergence histograms that are selected to represent respective patterns from the pattern set 210 (i.e., patterns 211-215, respectively). Labels 221-225 are also positioned along with arrows pointing roughly to the braches and leaves in the trie 205 which correspond to the patterns 211-215, respectively.

In one example, look-up tables may be truncated to include a top "X" number of positions that are most likely to result in a mismatch, where "X" can be selected to optimize an improvement in a time to process a plurality of incoming data blocks, e.g., a top three positions, a top five positions, a top 20 positions, etc. The time to process (or "throughput") can be determined empirically and used as feedback for "X" to be adjusted up or down to maximize the throughput. In particular, "X" may be increased while a measured throughput continues increased. However, if "X" is further increased and the throughput begins to decrease, then "X" may be scaled back. For instance, at some point, additional positional comparisons between the incoming data packet 250 and the divergence histograms in the set of divergence histograms 220 may be take more time and/or resources that performing a traversal of trie 205.

As further illustrated in FIG. 2, an incoming data block 250 may be processed first by performing a pre-processing in connection with the set of divergence histograms 220. For instance, processing path 291 illustrates how incoming data block 250 is processed in accordance with the present discourse, e.g., in contrast to processing path 292, where incoming data block 250 may simply be processed via a pattern search algorithm over trie 205. In one example, incoming data block 250 may represent a packet header and/or packet payload of a packet being processed in a communication network. Incoming data block 250 may be compared to various divergence histograms (e.g., look-up tables) in the set of divergence histograms 220. In one example, a look-up table is traversed in order, such that a position that is most likely to result in a mismatch may be compared first to the data value in the corresponding position in the incoming data block. This may be followed by comparing the data value of the position of the pattern that is the second most likely to result in a mismatch with a data value in a corresponding position in the incoming data block 250, and so on.

When the incoming data block is not a match to any of the divergence histograms, the incoming data block may be further handled via processing path 293, e.g., for further operations in accordance with a designated function of the pattern matching algorithm. However, if the incoming data block 250 matches one of the divergence histograms in the set of divergence histograms 220, the incoming data block 250 may follow processing path 294 for processing via the pattern search algorithm over trie 205. In particular, the pattern search algorithm over trie 205 may confirm or deny whether the incoming data block 250 actually matches the pattern associated with the divergence histogram. In the present example, incoming data block 250 does not match the pattern 211, where the mismatch may be determined when the data value in the position labeled 255 in the incoming data block 250 (the letter "Z") is compared to the data value in the position labeled 281 in the divergence histogram 231 (the letter "Y"). It should be noted that these may be the "same" positions within a sequence of the pattern 210 and the incoming data block 250, e.g., the $20^{th}$ position from the start or end of the sequence, the $100^{th}$ position from the start or end of the sequence, the $1000^{th}$ position from the start or end of the sequence, and so forth.

In one example, FIG. 2 may include the following assumptions: there are ten patterns in the pattern set 210 and trie 205, there are a total of 36 possible symbols (letters A-Z and numbers 0-9), and the packet payload of incoming data block 250 contains a string that causes the following comparisons to occur: 35—the longest sequence before encountering a mismatch (A . . . Z01 . . . 98, where the "9" in the mismatch), 25—the second longest sequence before a mismatch (A . . . ZY, where the "Z" is the mismatch), and 24—the third longest sequence before a mismatch (BCD . . . ZY, where the "Z" is the mismatch). Continuing with the present example, where the pattern of the incoming data block 250 does not match a pattern at the position labeled 251, a total of 685 comparisons may be used to determine a mismatch (35+25+24+ . . . +1=685) using a trie traversal pattern matching algorithm. Similarly, where the pattern of the incoming data block 250 does not match a pattern at the position labeled 252, a total of 650 comparisons may be used to determine a mismatch (25+24+23+ . . . +1=650) using trie traversal pattern matching. In contrast, in accordance with the present disclosure, 26 comparisons may be used for determining a mismatch at the position labeled 251, while 24 comparisons may be used for determining a mismatch at the position labeled 252.

Figure 3:
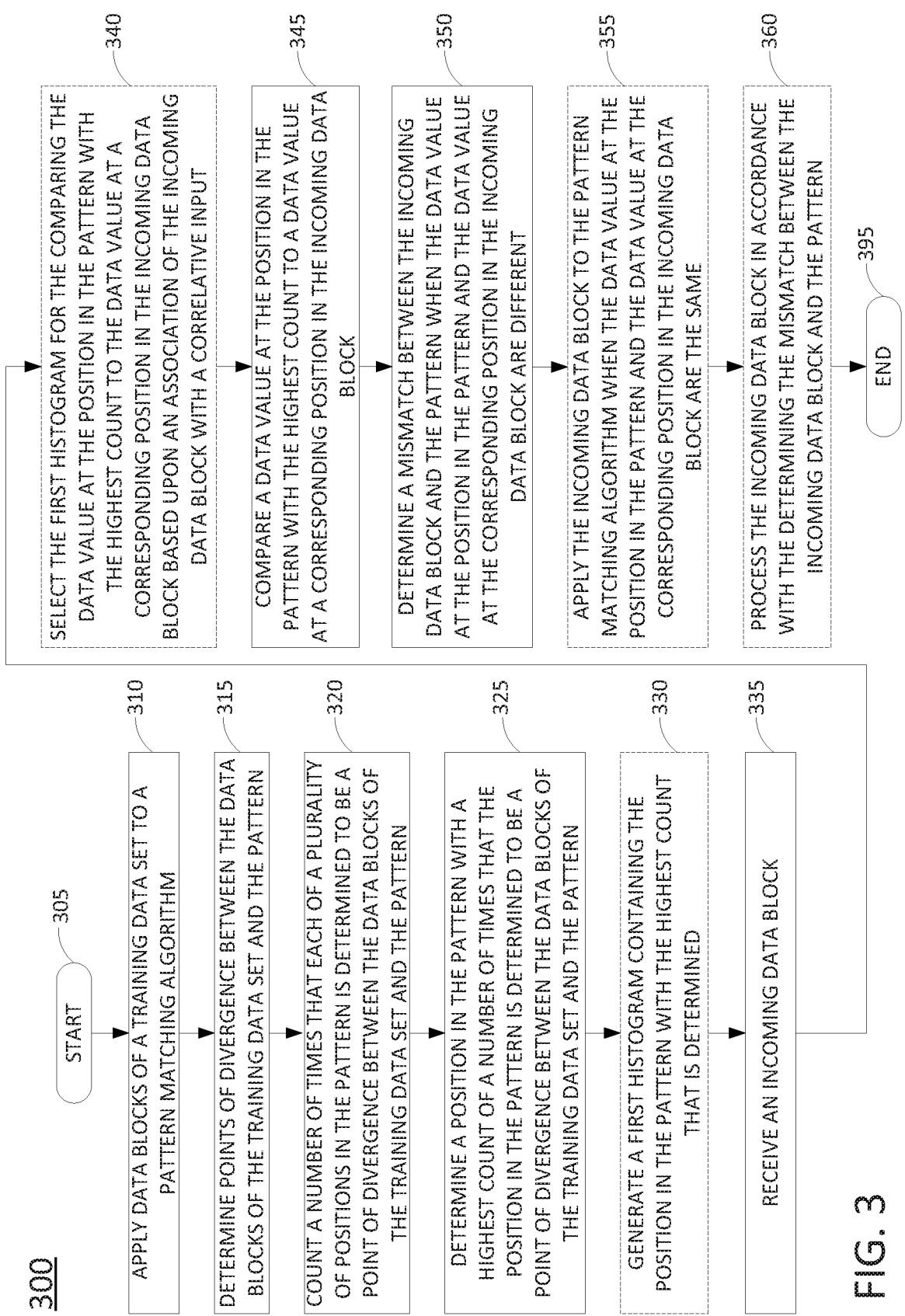
FIG. 3 illustrates an example flowchart of a method for determining a mismatch between a data block and a pattern of a pattern matching algorithm.

FIG. 3 illustrates an example flowchart of a method 300 for determining a mismatch between a data block and a pattern of a pattern matching algorithm. In one example, the steps, operations, or functions of the method 300 may be performed by any one or more of the components of the system 100 depicted in FIG. 1. For instance, in one example, the method 300 is performed by the application server 135 or application server 152, or by application server 135 or application server 152 in conjunction with other components of the system 100. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in system 100 may be configured to perform various steps, operations or functions of the method 300, the method will now be described in terms of an example where steps or operations of the method are performed by a processor, such as processor 402 in FIG. 4.

The method 300 begins at step 305 and proceeds to step 310. At step 310, the processor applies data blocks of a training data set to a pattern matching algorithm, where the pattern matching algorithm identifies whether the data blocks of the training data set match a pattern of the pattern matching algorithm. In one example, the pattern is maintained as a finite state machine, a trie, a directed acyclic graph, or a hash table for the pattern matching algorithm. In one example, the pattern matching algorithm is a multi-pattern pattern matching algorithm that is associated with a plurality of patterns that includes the pattern. In one example, the plurality of patterns is maintained as a finite state machine, a trie, a directed acyclic graph, or a hash table for the pattern matching algorithm. In one example, the data blocks of the training data set comprise: packet header data, packet payload data, executable files, scripts, media files (e.g., images, audio, video, etc.), or text data. In one example, the processor may be deployed in a communication network, and the data blocks of the training data set comprise network traffic data. In one example, the data blocks of the training data set are associated with at least one correlative input. For instance, the at least one correlative input may comprise: a time of day, a day of week, a source of the data blocks, a sender identifier, a recipient identifier, a port number, a device type, a location, a serving base station, a URL, and so forth.

At step 315, the processor determines points of divergence between the data blocks of the training data set and the pattern, e.g., positions within the pattern where a data block of the training data set comprises a value that is different from a value at the position within the pattern.

At step 320, the processor counts a number of times that each of a plurality of positions in the pattern is determined to be a point of divergence between the data blocks of the training data set and the pattern. In one example, the result of step 320 is a divergence histogram which indicates the points, or positions within a pattern that are the most and least likely to result in a mismatch between the pattern and an incoming data block.

At step 325, the processor determines a position in the pattern with a highest count of a number of times that the position in the pattern is determined to be a point of divergence between the data blocks of the training data set and the pattern. In one example, this position is determined to be the position that is most likely to result in a mismatch with an incoming data block. In addition, as mentioned above, the pattern matching algorithm may comprise multi-pattern pattern matching algorithm that is associated with a plurality of patterns. Accordingly, in one example, for each of a plurality of patterns the processor may also: determine points of divergence between the data blocks of the training data set and the each of the plurality of patterns, count a number of times that each of a plurality of positions in the each of the plurality of patterns is determined to be a point of divergence between the data blocks of the training data set and the each of the plurality of patterns, and determine a position in the each of the plurality of patterns with a highest count of a number of times that the position in the each of the plurality of patterns is determined to be a point of divergence between the data blocks of the training data set and the each of the plurality of patterns. For instance, steps 310-325 may be expanded to include similar, parallel operations with respect to different patterns in a set of patterns.

Following step 325, the method 300 may proceed to step 335 or to optional step 330.

At optional step 330, the processor may generate a first histogram (e.g., a divergence histogram) containing the position in the pattern with the highest count that is determined. In one example, the first histogram is associated with at least one correlative input. For instance, as mentioned above the training data set may include data blocks associated with correlative inputs, such as time of day, day of week, user ID, telephone number, destination URL, and so forth. In one example, the "generating" of the first histogram at optional step 330 may include modifying a histogram generated at step 320. For instance, the first histogram may be represented as a look-up table with entries comprising positions in the first pattern, and the values contained in the respective positions, ordered by a likelihood of divergence. For instance, positions that are determined to be the most likely points of divergences are those positions with the highest counts that may be determined at step 325. In one example, at least one additional histogram associated with at least one different correlative input is created or modified at optional step 330, where additional data blocks of the training data set associated with a different correlative input are applied to the pattern matching algorithm via steps 310-325.

At step 335, the processor receives an incoming data block. The incoming data block may comprise: packet header data, packet payload data, executable files, scripts, media files (e.g., images, audio, video, etc.), text data, or other type of data that may be of the same type as the data blocks of the training data set. In another example, the processor may be deployed in a communication network, and the data blocks of the training data set and the incoming data block comprise network traffic data. Following step 335, the method 300 may proceed to step 345 or to optional step 340.

At optional step 340, the processor may select the first histogram for the comparing the data value at the position in the pattern with the highest count to the data value at a corresponding position in the incoming data block based upon an association of the incoming data block with the correlative input. For instance, the incoming data block may satisfy a condition of the correlative input, e.g., being received/processed at a particular time of day, day of week, etc. and/or satisfying multiple correlative input conditions, e.g., a particular user device accessing a particular URL. An example of a selection between two histograms associated with a same pattern is described above in connection with the example of FIG. 2. In an example involving multi-pattern searching, optional step 340 may include the processor making selections of a plurality of histograms associated with respective patterns of a plurality of patterns.

At step 345, the processor compares a data value at the position in the pattern with the highest count to a data value at a corresponding position in the incoming data block. In one example, the data blocks of the training data set and the incoming data block comprise: packet header data, packet payload data, executable files, scripts, media files (e.g., images, audio, video, etc.), or text data.

At step 350, the processor determines a mismatch between the incoming data block and the pattern when the data value at the position in the pattern and the data value at the corresponding position in the incoming data block are different. In an example involving multi-pattern searching, for each of a plurality of patterns the processor is for: comparing a data value at the position in the each of the plurality of patterns with the highest count to a data value at a corresponding position in the incoming data block, at step 345, and determining a mismatch between the incoming data block and the each of the plurality of patterns when the data value at the position in the each of the plurality of patterns and the data value at the corresponding position in the incoming data block are different, at step 350.

Alternatively, or in addition, in one example the processor is further for: determining a plurality of positions in the pattern with highest counts of a number of times that each of the plurality of positions in the pattern are determined to be points of divergence between the data blocks of the training data set and the pattern (e.g., via steps 310-325), comparing data values at the plurality of positions in the pattern with the highest counts to data values at corresponding positions in the incoming data block (e.g., at step 345), and determining a mismatch between the incoming data block and the pattern when a data value of at least one of the plurality of positions in the pattern and a data value of at least one a plurality of corresponding positions in the incoming data block are different (e.g., as step 350). In one example, the number of the plurality of positions for which comparisons are made is selected to optimize an incoming data block throughput, e.g., a total execution time of determining whether each of a plurality of incoming data blocks is a match to the pattern. In addition, in one example, when a mismatch between the incoming data block and the pattern (or each of a plurality of patterns is determined), an additional data block is processed without applying the incoming data block to the pattern matching algorithm.

Following step 350, the method 300 may proceed to step 395 or to optional steps 355 and/or 360.

At optional step 355, the processor may apply the incoming data block to the pattern matching algorithm when the data value at the position in the pattern and the data value at the corresponding position in the incoming data block are the same. For instance, as described above, if there is a match based upon a comparison of one or more positions of a divergence histogram with corresponding positions of an incoming data block, it is not necessarily the case that there is an actual match between the incoming data block and the pattern. Thus, a full pattern search algorithm, e.g., a trie traversal or the like, may be performed to confirm (or deny) an actual match between the incoming data block and the pattern. Following optional step 355, the method 300 may proceed to step 395 or to optional step 360.

At optional step 360, the processor may process the incoming data block in accordance with the determining the mismatch between the incoming data block and the pattern. For instance, as mentioned above, in one example, the processor may be deployed in a communication network, and the data blocks of the training data set and the incoming data block may comprise network traffic data. In such an example, the processing at optional step 360 may comprise, for example: dropping the incoming data block, admitting the incoming data block, storing the incoming data block, copying the incoming data block, forwarding the incoming data block, and so forth. In one example, the processor may cause the abovementioned types of processing to occur by transmitting instructions to one or more additional devices in a network, e.g., a router, a firewall, a user endpoint device, etc.

Following optional step 360, the method 300 may proceed to step 395. At step 395, the method 300 ends.

It should be noted that the method 300 may be expanded to include additional steps or may be modified to include additional operations with respect to the steps outlined above. For example, the method 300 may be repeated through various cycles of training data blocks and incoming data blocks, and the divergence histograms may be updated and selected to process new/additional incoming data blocks. In another example, different types of data structures for storing one or more patterns and/or different pattern search algorithms may be used in connection with the method 300. In still another example, steps 310-330 may be performed by a first device or processor, while steps 335-350 may be performed by a different device or processor. For instance, steps 335-350 may comprise "live" operation steps that are performed with active network elements for processing customer traffic in a communication network, while steps 310-330 may comprise "offline" processing steps that may be performed via one or more devices in a data center, a network operations center, or the like which do not actively process customer traffic in real-time. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

As such, the present disclosure provides at least one advancement in the technical field of machine learning models and automatic pattern recognition/pattern matching for network traffic classification, digital image processing, and so forth. This is in contrast to traditional approaches of improving the speed of pattern searching algorithms, e.g., by modifying the storage data structure(s) and/or by modifying the pattern search algorithm(s), such as using a multi-level hashing, using sparse tries, and so forth. In contrast, examples of the present disclosure provide improvements in front-end processing applicable to a wide variety of pattern matching algorithms and data structures for storing multiple patterns.

The present disclosure also provides a transformation of data, e.g., divergence histograms are modified and re-ordered by a position or positions most likely to result in a mismatch, which are then used in a pre-processing of incoming data blocks, e.g., prior to application of a full pattern search algorithm/trie traversal. Divergence histograms are also updated in accordance with additional training data that may be received and applied to a pattern search algorithm to determine new/additional measures of a likelihood of each of a plurality of positions in a pattern being a point of divergence. In addition, new data is generated insofar as examples of the present disclosure may initially create the divergence histograms from a training data set.

Finally, examples of the present disclosure improve the functioning of a computing device, e.g., a server. Namely, a server deployed in the telecommunication service provider network is improved via the operations of the present disclosure to apply data blocks of a training data set to a pattern matching algorithm to identify whether the data blocks match a pattern, determine points of divergence between the data blocks and the pattern, count a number of times that each of a plurality of positions in the pattern is determined to be a point of divergence, and determine a position with a highest count of a number of times that the position is determined to be a point of divergence. The same or a different server may further receive an incoming data block, compare a data value at the position in the pattern with the highest count to a data value at a corresponding position in the incoming data block, and determine a mismatch when the data value at the position in the pattern and the data value at the corresponding position in the incoming data block are different. Furthermore, a telecommunication service provider network is also transformed via the operations for determining a mismatch between a data block and a pattern of a pattern matching algorithm, in accordance with examples of the present disclosure, such as by performing faster classification, and hence faster packet processing at various routers, switches, and other devices in the network.

Figure 4:
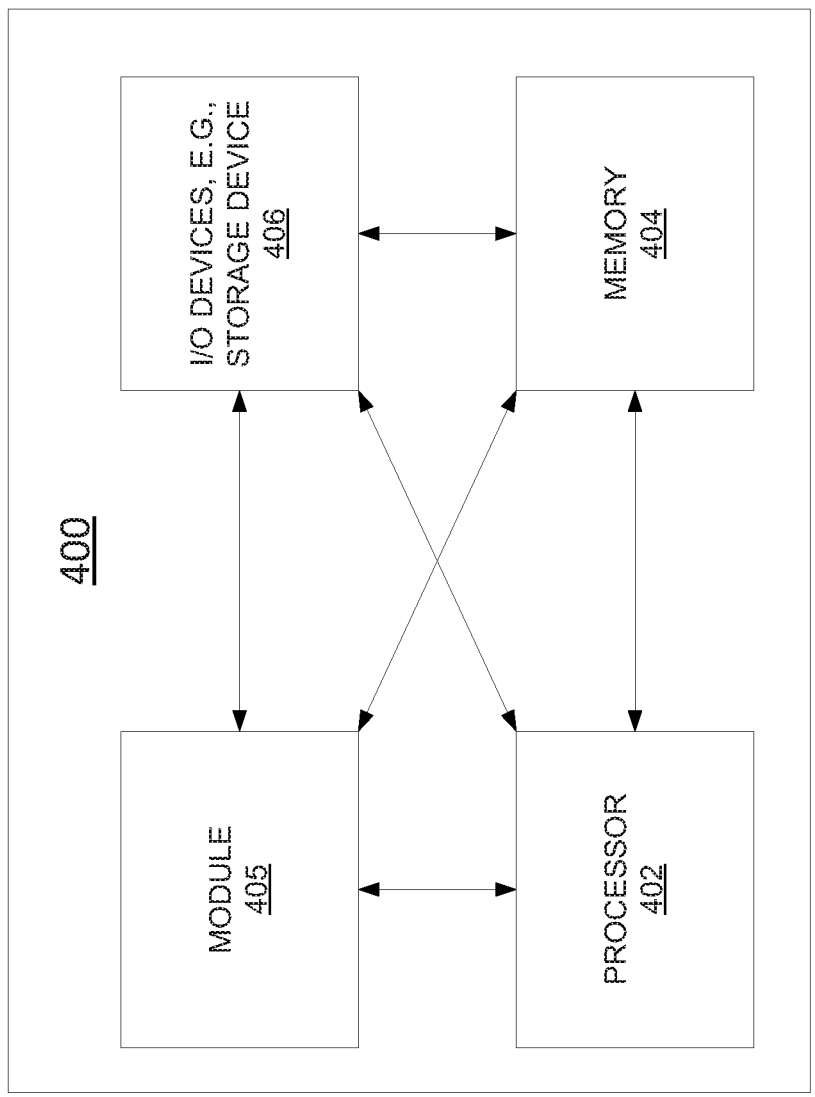
FIG. 4 illustrates a high-level block diagram of a computing device specially programmed to perform the functions described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining a mismatch between a data block and a pattern of a pattern matching algorithm, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 402 can also be configured or programmed to cause other devices to perform one or more operations as discussed above. In other words, the one or more hardware processors 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 405 for determining a mismatch between a data block and a pattern of a pattern matching algorithm (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining a mismatch between a data block and a pattern of a pattern matching algorithm (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
   a processor;
   a non-transitory computer-readable medium storing instructions which, when executed by the processor, cause the processor to perform operations, the operations comprising:
      applying data blocks of a training data set to a pattern matching algorithm, wherein the pattern matching algorithm identifies whether the data blocks of the training data set match a pattern of the pattern matching algorithm;
      determining points of divergence between the data blocks of the training data set and the pattern;
      counting a number of times that each of a plurality of positions in the pattern is determined to be a point of divergence between the data blocks of the training data set and the pattern;
      determining a position in the pattern with a highest count of a number of times that the position in the pattern is determined to be the point of divergence between the data blocks of the training data set and the pattern;
      receiving an incoming data block;
      comparing a data value at the position in the pattern with the highest count to a data value at a corresponding position in the incoming data block;
      determining a mismatch between the incoming data block and the pattern when the data value at the position in the pattern and the data value at the corresponding position in the incoming data block are different; and processing an additional incoming data block without applying the incoming data block to the pattern matching algorithm when the mismatch is determined.

2. The device of claim 1, wherein the operations further comprise:
applying the additional incoming data block to the pattern matching algorithm when the data value at the position in the pattern and a data value at a corresponding position in the additional incoming data block are the same.

3. The device of claim 1, wherein the pattern is maintained as a finite state machine, a trie, a directed acyclic graph, or a hash table for the pattern matching algorithm.

4. The device of claim 1, wherein the pattern matching algorithm is a multi-pattern pattern matching algorithm that is associated with a plurality of patterns, wherein the plurality of patterns includes the pattern.

5. The device of claim 4, wherein the plurality of patterns is maintained as a finite state machine, a trie, a directed acyclic graph, or a hash table for the pattern matching algorithm.

6. The device of claim 1,
wherein the determining the position in the pattern comprises determining a plurality of positions in the pattern with highest counts of a number of times that each of the plurality of positions in the pattern is determined to be a point of divergence between the data blocks of the training data set and the pattern;
wherein the comparing comprises comparing data values at the plurality of positions in the pattern with the highest counts to data values at corresponding positions in the incoming data block; and
wherein the determining the mismatch comprises determining the mismatch between the incoming data block and the pattern when a data value of at least one of the plurality of positions in the pattern and a data value of at least one a plurality of corresponding positions in the incoming data block are different.

7. The device of claim 6, wherein a number of the plurality of positions is selected to optimize a total execution time of determining whether each of a plurality of incoming data blocks is a match to the pattern.

8. The device of claim 1, wherein the data blocks of the training data set are associated with a correlative input.

9. The device of claim 8, wherein the correlative input comprises:
a time of day;
a day of week;
a source of the data blocks;
a sender identifier;
a recipient identifier;
a port number;
a device type;
a location; or
a serving base station.

10. The device of claim 8, wherein the operations further comprise:
generating a first histogram containing the position in the pattern with the highest count that is determined, wherein the first histogram is associated with the correlative input.

11. The device of claim 10, wherein at least one additional histogram associated with a different correlative input is created by applying additional data blocks of the training data set associated with the different correlative input to the pattern matching algorithm.

12. The device of claim 11, wherein the operations further comprise:
selecting the first histogram for the comparing the data value at the position in the pattern with the highest count to the data value at the corresponding position in the incoming data block based upon an association of the incoming data block with the correlative input.

13. The device of claim 1, wherein the data blocks of the training data set and the incoming data block comprise:
packet header data;
packet payload data;
executable files;
scripts;
media files; or
text data.

14. The device of claim 1, wherein the processor is deployed in a communication network, wherein the data blocks of the training data set and the incoming data block comprise network traffic data, wherein the operations further comprise:
processing the incoming data block in accordance with the determining the mismatch between the incoming data block and the pattern.

15. The device of claim 14, wherein the processing comprises:
dropping the incoming data block;
admitting the incoming data block;
storing the incoming data block;
copying the incoming data block; or
forwarding the incoming data block.

16. A method comprising:
applying, by a processor, data blocks of a training data set to a pattern matching algorithm, wherein the pattern matching algorithm identifies whether the data blocks of the training data set match a pattern of the pattern matching algorithm;
determining, by the processor, points of divergence between the data blocks of the training data set and the pattern;
counting, by the processor, a number of times that each of a plurality of positions in the pattern is determined to be a point of divergence between the data blocks of the training data set and the pattern;
determining, by the processor, a position in the pattern with a highest count of a number of times that the position in the pattern is determined to be the point of divergence between the data blocks of the training data set and the pattern;
receiving, by the processor, an incoming data block;
comparing, by the processor, a data value at the position in the pattern with the highest count to a data value at a corresponding position in the incoming data block;
determining, by the processor, a mismatch between the incoming data block and the pattern when the data value at the position in the pattern and the data value at the corresponding position in the incoming data block are different; and
processing, by the processor, an additional incoming data block without applying the incoming data block to the pattern matching algorithm when the mismatch is determined.

17. The method of claim 16, further comprising:
applying the additional incoming data block to the pattern matching algorithm when the data value at the position in the pattern and a data value at a corresponding position in the additional incoming data block are the same.

18. The method of claim 16, wherein the pattern is maintained as a finite state machine, a trie, a directed acyclic graph, or a hash table for the pattern matching algorithm.

19. The method of claim 16, wherein the pattern matching algorithm is a multi-pattern pattern matching algorithm that is associated with a plurality of patterns, wherein the plurality of patterns includes the pattern.

20. A non-transitory computer-readable storage medium storing instructions which, when executed by a processor, cause the processor to perform operations, the operations comprising:

applying data blocks of a training data set to a pattern matching algorithm, wherein the pattern matching algorithm identifies whether the data blocks of the training data set match a pattern of the pattern matching algorithm;

determining points of divergence between the data blocks of the training data set and the pattern;

counting a number of times that each of a plurality of positions in the pattern is determined to be a point of divergence between the data blocks of the training data set and the pattern;

determining a position in the pattern with a highest count of a number of times that the position in the pattern is determined to be the point of divergence between the data blocks of the training data set and the pattern;

receiving an incoming data block;

comparing a data value at the position in the pattern with the highest count to a data value at a corresponding position in the incoming data block;

determining a mismatch between the incoming data block and the pattern when the data value at the position in the pattern and the data value at the corresponding position in the incoming data block are different; and processing an additional incoming data block without applying the incoming data block to the pattern matching algorithm when the mismatch is determined.

* * * * *